United States Patent
Walther et al.

[11] 3,897,111
[45] *July 29, 1975

[54] RIM MOUNTING

[75] Inventors: William D. Walther, Dayton; Robert A. DeRegnaucourt, Centerville, both of Ohio

[73] Assignee: Dayton-Walther Corporation, Dayton, Ohio

[ * ] Notice: The portion of the term of this patent subsequent to Oct. 22, 1991, has been disclaimed.

[22] Filed: Jan. 22, 1973

[21] Appl. No.: 325,510

[52] U.S. Cl. .......... 301/12 R; 301/11 R; 301/13 SM
[51] Int. Cl. ............................................. B60b 23/10
[58] Field of Search .... 301/10 R, 12 R, 11 R, 13 R, 301/13 SM, 36 R, 19, 20; 85/1 R

[56] References Cited
UNITED STATES PATENTS

| | | | |
|---|---|---|---|
| 1,372,230 | 3/1921 | Jenkins | 301/19 |
| 2,039,554 | 5/1936 | Rogers | 301/12 R |
| 2,042,783 | 6/1936 | Hall | 85/1 R |
| 2,819,118 | 1/1958 | Fahlman | 301/13 SM |
| 2,911,256 | 11/1959 | Canady | 301/36 R |
| 3,160,442 | 12/1964 | Walther | 301/12 |
| 3,259,437 | 7/1966 | Malthaner | 301/20 |

FOREIGN PATENTS OR APPLICATIONS 189,626   7/1922   United Kingdom ................. 85/1 R

*Primary Examiner*—M. Henson Wood, Jr.
*Assistant Examiner*—Reinhard J. Eisenzopf
*Attorney, Agent, or Firm*—Mack D. Cook, II

[57] ABSTRACT

An assembly for mounting single or dual rims on a wheel with extreme accuracy. Rotatable support bolts carrying fastening nuts moving clamp elements into engagement with a rim flange are moved to a predetermined "first stage" position to correctly align the rim on the wheel. Thereafter, the fastening nuts are moved relative to the support bolts to provide a "second stage" position so as to fully seat the rim on the wheel without distortion or misalignment.

8 Claims, 8 Drawing Figures

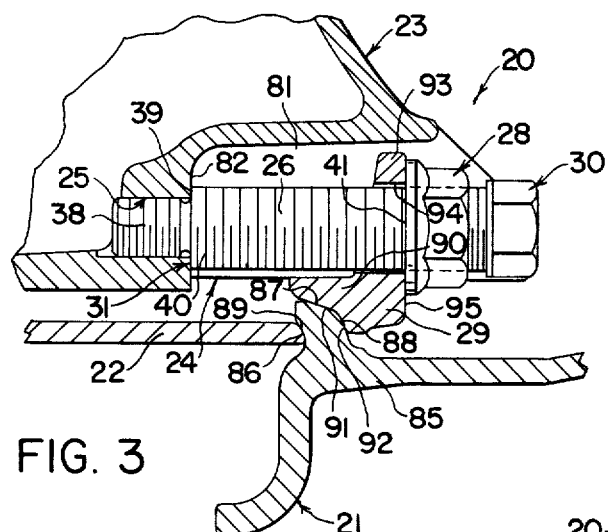
FIG. 3
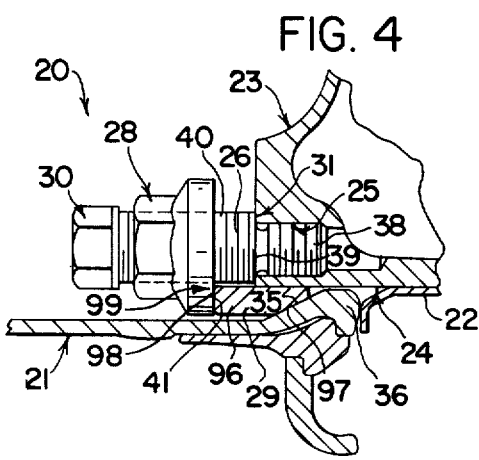
FIG. 4
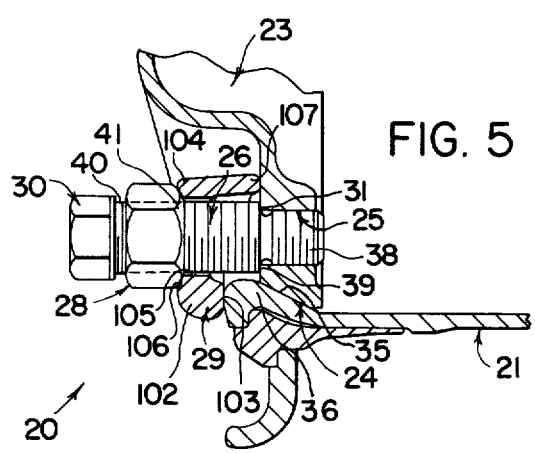
FIG. 5
FIG. 6

RIM MOUNTING

CROSS-REFERENCE TO RELATED APPLICATIONS

The subject matter of this invention is related to the subject matter of co-pending application Ser. No. 325,654, filed Jan. 22, 1973, now U.S. Pat. No. 3,843,200.

BACKGROUND OF THE INVENTION

The invention relates to the mounting of tire carrying rims, either single or dual, on a wheel, either front or rear, of a vehicle, such as a truck or trailer.

The prior art has many forms of assemblies for both single rim and dual rim mountings. U.S. Pat. No. 3,186,767, patented June/1965, U.S. Pat. No. 3,194,605 and No. 3,194,606, patented July/1965 and U.S. Pat. No. 3,382,007, patented May/1968, each to The Dayton Steel Foundry Company, contain disclosures of prior art assemblies of a support or stud bolt, fastening nuts, and clamp elements or lugs which have been used for rim mounting.

The accurate mounting of tire carrying rims on wheels has long been a problem in the art. Vehicle operators and industry regulations seek longer tire life and complete safety in operation, even under the most severe of vehicle operating conditions. The tire manufacturer is endeavoring to provide tires which have optimum performance characteristics including balance. The wheel manufacturer has introduced quality control which provide wheels of uniform dimension and weight. However, the potential advantages provided by accuracy in tire and wheel manufacture have often been sacrificed or lost by improper rim mounting techniques.

The prior assemblies for rim mounting if properly used should assure lateral alignment and minimize radial runout of the rim when mounted. In the prior assemblies, the mechanic who mounts tire carrying rims on wheels has been provided with support bolts or studs carrying heavy nuts which are torqued down, preferably using pneumatically actuated or power assisted drivers or wrenches, to drive and force the clamp elements into high load engagement with the rim mounting flanges. If the mechanic uses good judgment and procedure, as for example criss-cross tightening in steps of 30 foot pounds, then 100 foot pounds, then 225 foot pounds, he can achieve great accuracy in rim mounting. If the mechanic does not use good judgment and procedure, then the rim mounting will be incorrect and the technical requirements of correct lateral alignment and minimum radial runout will not be met when the vehicle is operated.

It has now been found that accuracy in the mounting of tire carrying rims on wheels may be achieved by the concepts of the present invention. More specifically, an assembly of elements has been provided so that rim mounting will have at least first stage and second stage positions. By providing for a first stage position, the rim is prevented from being drawn off side or out of alignment by the first clamping efforts. The first stage position approximates the final position insofar as the relation of the rim to the wheel is concerned, but does not achieve the second stage or fully tightened position. The concepts of the present invention assure that the mechanic should tighten all fastening nuts in an equal or equivalent manner to establish a first stage for rim mounting. Thereafter, using a different size driver or wrench, the mechanic proceeds with a second stage for rim mounting. The present invention provides the mechanic with a means to fully seat tire carrying rims on wheels without distortion or misalignment.

SUMMARY OF THE INVENTION

The object of the invention is to provide an improved assembly for mounting single or dual rims on a wheel.

It is a further object of the invention to provide an assembly for at least first stage position and second stage position mounting of single or dual rims with accuracy so as to assure lateral alignment and minimize radial runout of the rims when mounted.

These and other objects of the invention, and the advantages thereof, will be apparent in view of the description of a Preferred Embodiment and alternative embodiments, as set forth below.

In general, an assembly for rim mounting according to the invention comprises a series or sets of supports bolts, fastening nuts and clamp elements. The wheel has a series of axially directed bores adjacent the wheel felloe for rotatably receiving the axially inner portion of a support bolt. Each support bolt has a medial portion with external threads for rotatably mounting a fastening nut. Each fastening nut has a radially oriented flange surface for engaging a clamp element. Each clamp element has an axially directed bore for housing a support bolt and an axially directed portion for engaging the rim mounting flange.

The axially outer portion of a support bolt has a cap head thereon which when rotated will cause a fastening nut on bolt threads to engage a clamp element and move the clamp element axially toward, and into engagement with, the rim mounting flange. There is a stop means on the medial portion of the support bolt to limit the extent of axially inward movement of the fastening nut and clamp element and thereby establish a first stage position for rim mounting. Subsequent rotation of the fastening nut away from the cap head will move the clamp element further axially inwardly and thereby provide a second stage position for rim mounting. During the first stage of rim mounting, the clamp elements will be positioned so as to correctly align the rim on the wheel felloe. During the second stage of rim mounting, the clamp elements will be positioned so as to fully seat the rim on the wheel felloe without distortion or misalignment.

DESCRIPTION OF THE DRAWINGS

FIG. 3. is a view, similar to FIGS. 1 and 2, of still another dual rim mounting according to the invention, but with only the axially outer rim and a portion of the spacer being shown;

FIG. 4 is a view similar to FIG. 3, with only the axially outer rim and a portion of the spacer being shown, showing a modified clamp element for use with the rims with FIG. 1;

FIG. 5 is a fragmentary sectional view of a single rim mounting according to the invention; and FIG. 6 is a plan view of a support bolt with indicia thereon to indicate relative positioning of a fastening nut during second stage mounting.

DETAILED DESCRIPTION OF THE INVENTION

Figure 1:
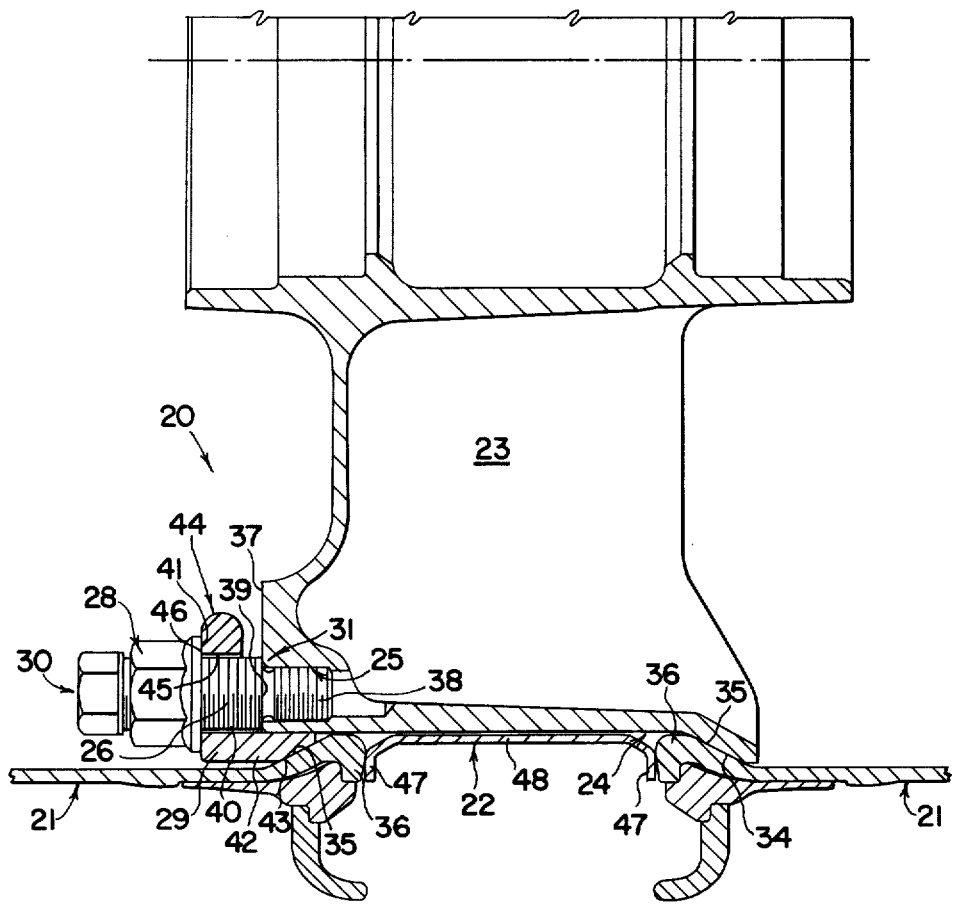
FIG. 1 is a fragmentary sectional view of a dual rim mounting according to the invention.
Figure 1A:
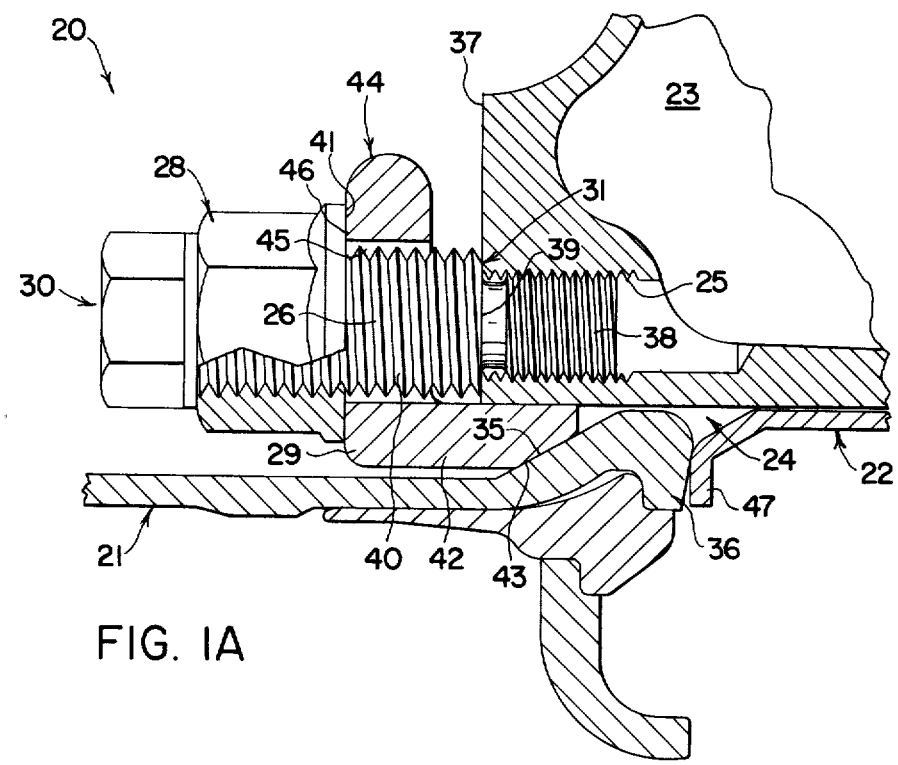
FIG. 1A is an enlarged fragmentary view showing the elements of FIG. 1 in "first stage" mounting position.
Figure 1B:
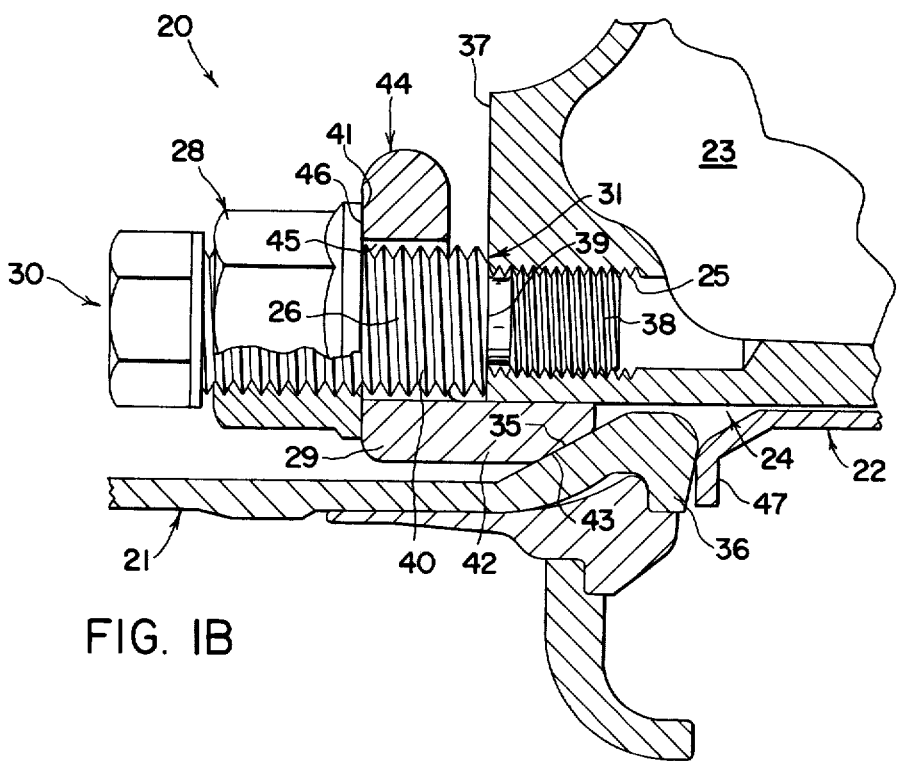
FIG. 1B is a similar view showing the elements of FIG. 1 in "second stage" mounting position.

A rim mounting according to the invention is referred to generally by the numeral 20. The rims, whether single or dual inner and outer rims, are referred to generally by the numeral 21. The spacer for dual rim mounting is referred to generally by the numeral 22. The wheel is referred to generally by the numeral 23 with the wheel felloe, felly or load-bearing surface being referred to generally by the numeral 24 and with a series of axially directed bores adjacent the wheel felloe 24 being referred to generally by the numeral 25.

The support bolt of each assembly 20 is referred to generally by the numeral 26. The fastening nut of an assembly 20 rotatably mounted on the support bolt 26 is referred to generally by the numeral 28. The axially directed portion of a clamp element of an assembly 20 for engaging a rim 21 is referred to generally by the numeral 29. The cap head of a support bolt 26 is referred to generally by the numeral 30. The stops means on the support bolt 26 is referred to generally by the numeral 31. The linear indicia for showing if all fastening nuts 28 are moved axially inwardly an equal distance during the second stage for rim mounting is referred to generally by the numeral 32.

In FIG. 1, the assembly 20 is shown as used for the mounting of dual inner and outer rims 21 separated by a rigid spacer 22 on a wheel 23. The wheel 23 has a relatively wide felly surface 24 with an inclined surface 34 at the axially inner end for mating engagement with a radially inclined surface 35 on the mounting flange 36 of an inner rim 21. The axially outer end of the felly surface 24 terminates in radially oriented boss surfaces 37. The internally threaded bores 25 extend axially inward from the boss surfaces 37.

In FIG. 1, and in the other embodiments shown for use of an assembly 20, a support bolt 26 has an axially inner portion 38 with external threads for mating engagement with the threads of an axial bore 25. The axially inner portion 38 terminates at a radially oriented surface 39 extending transverse the axis of a support bolt 26 providing the stop means 31. The enlarged diameter medial portion 40 has external threads for mating engagement with the threads of a fastening nut 28. The fastening nut 28 has an axially inner or base portion providing a radially oriented flange surface 41 for engaging a clamp means including the clamp element 29.

In FIG. 1, the clamp element 29 is provided by the axially directed leg 42 of a conventional one-piece clamp lug having an inclined surface 43 for mating engagement with a radially inclined surface 35 on the mounting flange 36 of an outer rim 21. The axially directed leg 42 intersects a radially directed leg 44 with an axially directed bore 45 housing a support bolt 26 and having an axially outer surface 46 for engagement with a fastening nut flange surface 41. The rigid spacer 22 is a conventional annular spacer or spacer ring carried on the felloe surface 24. The spacer has lateral flanges or marginal portions 47 carried by a non-compressible medial portion 48. The spacer edges 47 are preferably oriented substantially vertically or perendicular to the rotational axis of the wheel 23.

Figure 2:
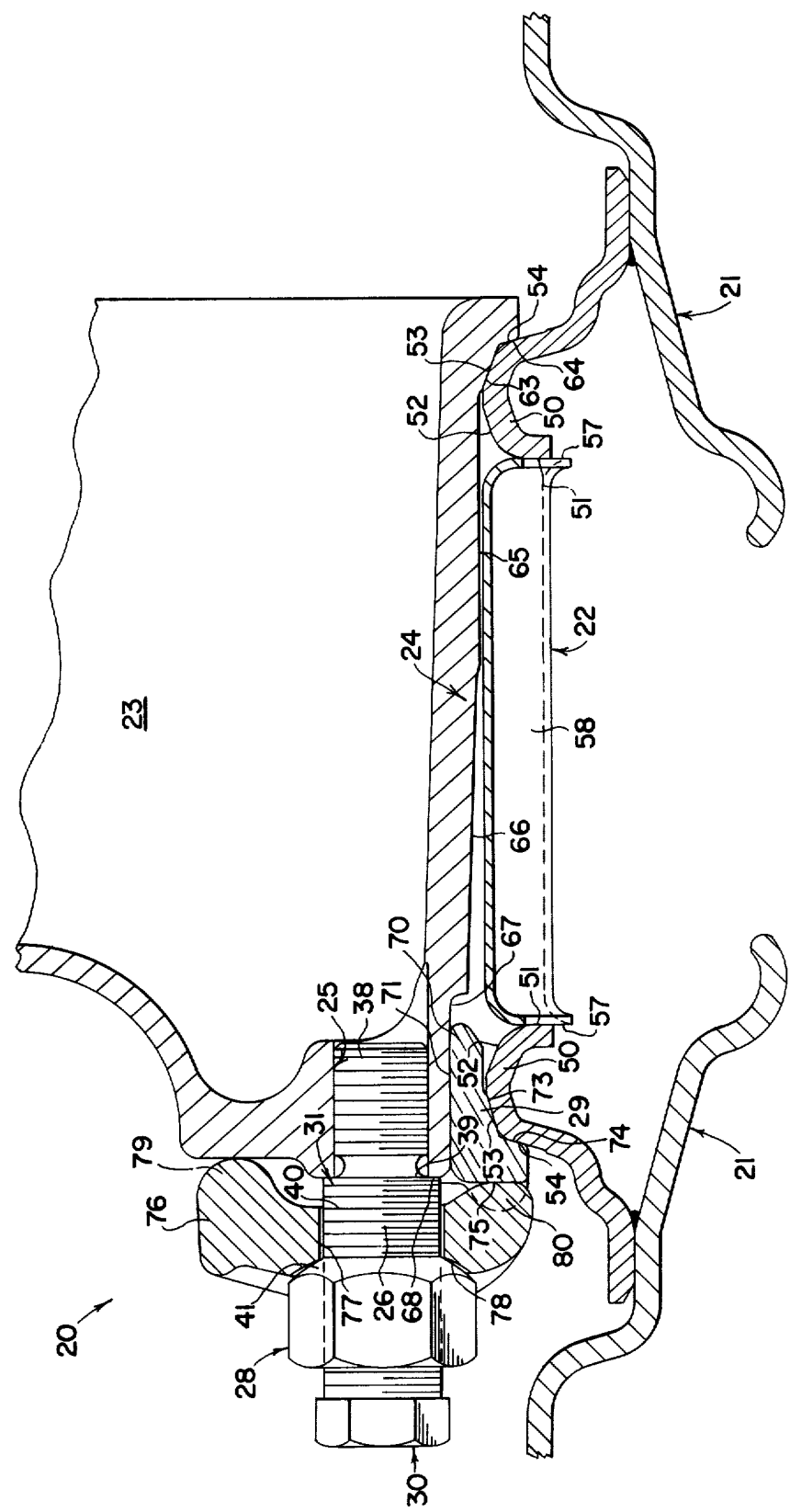
FIG. 2 is a view, similar to FIG. 1, of another dual rim mounting according to the invention, using wheel felly surfaces, rim mounting flanges, a spacer and clamp elements which are the subject matter of co-pending application Ser. No. 325,653, filed Jan. 22, 1973.

In FIG. 2, the assembly 20 is shown as used for the mounting of dual inner and outer rims 21 separated by a spacer 22 on a wheel 23.

In FIG. 2, each rim 21 has a radially inner flange 50 with four precisely dimensioned and intersecting surfaces. A first axially outer surface 51 is oriented substantially perpendicular to the rotational axis of the rim. A second inwardly directed surface 52 extends from surface 51 to the apex of a flange 50. A third outwardly inclined surface 53 extends from the flange apex at an angle substantially 18° from the rotational axis of the rim. A fourth outwardly and axially inclined surface 54 extends from surface 53 at an angle substantially 15° from perpendicular to the rotational axis of the rim.

In FIG. 2, the spacer 22 is an annular spacer or spacer ring positioned over the wheel felly surfaces 24. The spacer has lateral flanges or marginal portions 57 carried by a non-compressible medial portion 58. The spacer edges 57 are preferably oriented substantially vertically or perpendicular to the rotational axis of the wheel 23 for mating engagement with the surfaces 51 on the mounting flanges 50 of the dual rims 21.

In FIG. 2, the axially inner end of the wheel felloe 24 has two precisely dimensioned intersecting surfaces 63 and 64 for full seating engagment with 53 and 54 on the mounting flange 50 of the inner rim 21. Surface 65 extends axially outwardly from surface 63 and is preferably dimensioned to have a diameter less than the inner diameter of the medial portion 58 of a spacer 22. The surface 65 merges into an inwardly inclined surface 66 extending axially outwardly to intersect a horizontal surface 67 for sliding engagement with a clamp element 29. The surface 67 is precisely dimensioned so that a clamp element 29 may be drawn into full seating engagement with the mounting flange 50 of the outer rim 21 during second stage positioning by the assembly 20. The axially outer end of the felly surface 67 terminates in radially oriented boss surfaces 68. The internally threaded bores 25 extend axially inwardly from the boss surfaces 68.

In FIG. 2, the clamp element 29 is provided by the axially directed wedge member 70 of a two-piece clamp means. A wedge member 70 has a precisely dimensioned radially inner and axially extended surface 71 for piloted sliding engagement with the wheel felly surface 67. A wedge member 70 also has two precisely dimensioned intersecting surfaces 73 and 74 for full seating engagement with surfaces 53 and 54 on the mounting flange 50 of the outer rim 21.

The axially outer end of a wedge member 70 has a surface 75 for mating engagement with the radially directed member 76 of the two-piece clamp means. The clamp member 76 has an axially directed bore 77 housing a support bolt 26 and an axially outer surface 78 for engagement with a fastening nut conical or ball face flange surface 41. The radially inner end of a clamp member 76 preferably has an axially inwardly directed portion 79 for engagement with the wheel 23 during second stage positioning by the assembly 20.

As shown in FIG. 2, there is an individual wedge member 70 associated with each clamp member 76. While not shown, the wedge member 70 could be made in the form of a full-circle or ring member with the precisely dimensioned surfaces 71, 73 and 74 thereon. In either the individual form or the full ring form, the wedge member 70 may have sets of axially outwardly directed projections or flanges 80 for guiding axially inward movement of the clamp members 76 during first stage positioning by the assembly 20.

In FIG. 3, the assembly 20 is shown as used for the mounting of dual inner (not shown) and outer rims 21 separated by a rigid spacer 22 on a wheel 23. The wheel 23 has a relatively wide felloe surface 24 which is interrupted at the axially outer end by a series of axially directed recesses 81. Each recess 81 terminates at a radially directed boss surface 82 and houses a support bolt 26. The internally threaded bores 25 extend axially inwardly from the boss surfaces 82.

In FIG. 3, each rim 21 has a radially inner flange 85. A rim mounting flange 85 has an axially outer concave surface 86 and an axially inclined surface 87 intersecting a radially directed surface 88. The spacer 22 is an annular spacer or spacer ring positioned around the wheel 23. The spacer has convex edges 89 for mating engagment with the surfaces 86 on the mounting flanges 85 of the dual rims 21.

In FIG. 3, the clamp element 29 is provided by the axially directed leg 90 of a one-piece clamp lug having intersecting surfaces 91 and 92 for mating engagement with the surfaces 87 and 88 on the mounting flange 85 of an outer rim 21. The axially directed leg 90 intersects a radially directed leg 93 with an axially directed bore 94 and having an axially outer surface 95 for engagement with a fastening nut flange surface 41.

While not shown in FIG. 3, the axially inner end of the wheel felloe 24 has surfaces equivalent in orientation to clamp lug surfaces 91 and 92 for mating engagement with the surfaces 87 and 88 on the mounting flange 85 of an inner rim 21.

FIG. 4 shows a modification to the assembly 20 as shown in FIG. 1. In FIG. 4, the clamp element 29 is an axially directed wedge member 96 having an inclined surface 97 for mating engagement with a radially inclined surface 35 on the mounting flange 36 of an outer rim 21. The axially outer end of the wedge member 96 has a surface 98 for mating engagement with a fastening nut flange surface 41. The flange surface 41 is on an enlarged diameter portion 99 carried by the fastening nut 28.

In FIG. 5, the assembly 20 is shown as used for the mounting of a single rim 21 on the wheel 23. The felloe surface 24 is inclined for mating engagement with the radially inclined surface 35 on the mounting flange 36 of the rim 21.

In FIG. 5, the clamp element 29 is provided by the axially directed leg 102 of a one-piece clamp lug having a radially oriented surface 103 for mating engagement with the mounting flange 36 of the rim 21. The axially directed leg 102 intersects a radially directed leg 104 with an axially directed bore 105 housing a support bolt 26 and having an axially outer surface 106 for engagement with the fastening nut conical or ball face flange surface 41. The radially inner end of a clamp leg 104 preferably has an axially inwardly directed portion 107 for engagement with the wheel 23 during second stage positioning by the assembly 20.

FIG. 6 illustrates the support bolt 26, fastening nut 28 and cap head 30 of an assembly 20. FIG. 6 further shows a linear indicia or scale 32 which has a suitable calibration thereon to indicate the extent of movement by a fastening nut 28 away from the cap head 30 during second stage for rim mounting.

OTHER EMBODIMENTS AND MODIFICATIONS

In each embodiment of an assembly 20 shown and described, the axially directed portion of a clamp lug 29 moved by a fastening nut 28 into engagement with a mounting flange of a rim 21, whether single or dual rim mounting, is on the axially directed leg of a one-piece clamp lug. In a one-piece clamp lug the axially directed leg intersects and is formed integrally with a radially directed leg. However, and although not shown, the clamp element could be an axially directed wedge member for engaging the rim flange, movable either by direct engagement with a fastening nut flange surface 41 or through an intermediate radially oriented member, during first stage and second stage rim mounting.

It should also be apparent from the drawings and description, that the provision for first stage and second stage positions for rim mounting represents an optimum producing of highly advantageous results. However, the concepts of the invention as disclosed herein could be carried to three or more stages providing repetitive techniques or an iteration process or concept for rim mounting.

Accordingly, the scope of the claims set forth below should be limited only by the concepts disclosed herein and not by specific details of the described embodiments.

FURTHER DESCRIPTION OF RIM MOUNTING

In FIG. 1 A, the assembly 20 of FIG. 1 is shown in first stage mounting position of an outer rim 21 on a wheel felloe surface 24. Prior to this, the fastening nut 28 has been threaded onto the medial portion 40 of the support bolt 26 and rotated outwardly into contact with the cap head 30. The support bolt 26 has also been inserted through the bore 45 of the clamp lug which is located with the clamp element 29 radially outwardly of the wheel felloe 24. Thereafter, the inner portion 38 of the support bolt 26 has been inserted into bore 25 and rotated until the stop means 31 has contacted the wheel boss surface 37. In this position, the clamp element 29 will be in mating engagement with the inclined surface 35 on the rim mounting flange 36 and in piloted engagement with the wheel felloe 24, and, the outer rim will be in contact with the spacer edge 47 so as to correctly align the outer rim 21 on the wheel felloe 24.

FIG. 1 B, follows sequentially of FIG. 1 A and shows the assembly 20 in the second stage mounting position. Prior to this, the fastening nut 28 on the medial portion 40 of the support bolt 26 has been rotated away from the cap head 30 causing the flange surface 41 to further move the clamp element 29 axially in relation to the rim flange 36. In this position, the clamp element will be in seating engagement with the rim surface 35 and the wheel felloe 24, and the outer rim 21 will be in seating engagement with the spacer edge 47, so as to fully seat the outer rim on the wheel felloe 24 without distortion or misalignment.

The mechanic is preferably instructed when using the assembly 20 for rim mounting to refer to the linear indicia 32 on the support bolt 26 to assure that all fastening nuts 28 are moved an equal distance during the second stage for rim mounting.

What is claimed is:
1. An assembly for mounting of at least one rim having a mounting flange on the felloe of a wheel,
said assembly comprising a series of support bolts, fastening nuts and clamp elements,
said wheel having a series of axially directed bores adjacent said wheel felloe for rotatably receiving the axially inner portion of a support bolt,
each support bolt having a medial portion with external threads for rotatably mounting a fastening nut,
each fastening nut having a radially oriented flange surface for engaging a clamp element,
each clamp element having an axially directed bore for housing said support bolt and an axially directed portion for engaging the rim mounting flange,
the axially outer portion of a support bolt having a cap head thereon which when rotated will cause a fastening nut on said bolt threads to engage said clamp element and move said clamp element axially toward the rim mounting flange,
there being stop means on the medial portion of a support bolt to limit the extent of axially inward movement of a fastening nut and clamp element,
whereby, subsequent rotation of a fastening nut away from said cap head will fully seat the rim on the wheel.

2. An assembly according to claim 1, wherein said wheel bores have interior threads and the axially inner end of a support bolt has exterior threads mating with said bore threads.

3. An assembly according to claim 1, wherein said clamp element is a clamp lug having a radially directed leg with said axially directed bore housing said support bolt and intersecting said axially directed portion for engaging the mounting flange on said rim.

4. An assembly according to claim 1, wherein said clamp element is an axially oriented wedge member with an axially outer surface for mating engagement with the flange surface of a fastening nut.

5. An assembly according to claim 1, wherein said clamp element has two pieces, a radially directed member with said axially directed bore housing said support bolt, and an axially oriented wedge member with an axially outer surface for mating engagement with the radially directed member.

6. An assembly according to claim 1, wherein the portion of said support bolt adjacent said cap head has linear indicia thereon to show if all clamp elements are moved axially inwardly an equal distance during rim mounting.

7. An assembly according to claim 3, wherein the radially directed leg of said clamp lug has an axially directed portion radially inwardly of said bore for limiting the axial movement of the clamp lug.

8. An assembly for mounting of at least one rim having a mounting flange on the felloe of a wheel,
said assembly comprising a series of support bolts, fastening nuts and clamp elements,
each support bolt having external threads,
said wheel having a series of axially directed bores adjacent said wheel felloe for rotatably receiving the axially inner portion of a support bolt, each support bolt being positioned in a bore so as to expose a predetermined length of external thread for rotatably mounting a fastening nut,
each fastening nut having a radially oriented flange surface for engaging a clamp element,
each clamp element having an axially directed bore for housing a support bolt and an axially directed portion for engaging the rim mounting flange,
the axially outer portion of a support bolt having a cap head thereon which when rotated will cause a fastening nut on said bolt threads to engage said clamp element and move said clamp element axially toward the rim mounting flange,
whereby, subsequent rotation of a fastening nut away from said cap head will fully seat the rim on the wheel.

* * * * *